United States Patent Office 3,349,104
Patented Oct. 24, 1967

3,349,104
2-ACYLOXYPHENYL-4,8-DIAMINO-1,5-DIHYDROXY-ANTHRAQUINONES
Frank Lodge, Manchester, England, assignor to Imperial Chemical Industries Limited, London, England, a corporation of Great Britain
No Drawing. Filed Aug. 5, 1963, Ser. No. 300,047
Claims priority, application Great Britain, Aug. 13, 1962, 30,984/62
4 Claims. (Cl. 260—376)

This invention relates to a process for dyeing textile materials comprising synthetic or cellulose ester fibres, particularly polyester, polyamide, polyacrylic and cellulose acetate and triacetate fibres, to new water-insoluble dyestuffs of the anthraquinone series for use in such a process, and to a manufacturing process for the said new dyestuffs.

According to the invention a process for dyeing textile materials comprising synthetic or cellulose ester fibres comprises applying thereto one or more water-insoluble disperse dyestuffs of the formula

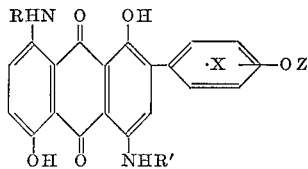

Formula 1 wherein R and R' represent hydrogen, lower alkyl or acyl radicals and may be the same or different, the benzene ring X may carry substituents except halogen, nitro and amino groups, Z represents hydrogen or a substituted or unsubstituted lower alkyl, cycloalkyl, aryl or acyl radical, and the term "lower" indicates a radical of not more than 8 carbon atoms, provided that R, R' and Z do not all simultaneously represent hydrogen and that the dyestuff molecule is devoid of sulphonic and carboxylic acid groups.

Lower alkyl radicals represented by R and R' may be, for example, methyl, ethyl, propyl or butyl radicals and acyl radicals represented by R and R' may be, for example, acetyl, propionyl, butyryl, methanesulphonyl, tosyl or benzoyl radicals.

Substituents which may be carried by the benzene ring X may be, for example lower alkyl radicals e.g. methyl, ethyl, amyl and octyl, cycloalkyl radicals e.g. cyclohexyl, hydroxyl radicals, lower alkoxy radicals e.g. methoxy and ethoxy, acyloxy radicals e.g. acetoxy and benzoyloxy and aryl radicals e.g. phenyl.

The radical represented by Z may be, for example, methyl, ethyl, propyl, butyl, β-hydroxyethyl, β-ethoxyethyl, cyclohexyl, phenyl, p-tolyl, acetyl, propionyl, benzoyl, p-toluyl, methanesulphonyl or tosyl.

If desired dyestuffs of Formula 1 may be used in admixture with each other or with other dyestuffs. Mixtures of two or more dyestuffs of Formula 1 frequently have better building-up properties than the individual constituents of the mixture.

The compounds used in the process of the invention are obtainable by methods known in the art. Thus to obtain the dyestuffs in which Z represents hydrogen or a lower alkyl, cycloalkyl or aryl radical an appropriately N-substituted 1:5-dihydroxy-4:8-diaminoanthraquinone-2:6-disulphonic acid may be reacted with a phenol or phenol ether, using the conditions of German Patent 445,269, the leuco-compound so obtained may be treated with an aqueous alkali under the conditions of German Patent 446,563, whereby one sulpho-group is eliminated, and the remaining sulphonic acid group may then be removed by reduction, as described in German Patent 456,-235. The compounds in which R and Z represent acyl radicals can be obtained by acylation of the corresponding compounds in which R and Z are hydrogen.

The process of the invention may be carried out by immersing the textile material in a dyebath comprising an aqueous dispersion of a compound of the above formula, the dispersion being stabilised if desired by a dispersing agent such as a formaldehyde-naphthalene sulphonic acid condensate, sodium ligninsulphonate or the dried residue of sulphite waste liquor. Other wetting, dispersing or emulsifying agents may also be present such as fatty alcohol sulphonates or sulphates e.g. oleyl sodium sulphate or sulphonated castor oil.

The dyeing conditions will depend upon the material to be dyed, and in general are the conditions commonly used for applying disperse dyestuffs to the particular material.

Thus secondary cellulose acetate may be dyed at about 75° to 90° C., preferably 80° to 85° C. for about 45 to 90 minutes. Cellulose triacetate and polyamide materials are dyed at or near the boil for about 45 to 90 minutes or at higher temperatures under pressure (with consequent shorter times) if desired.

Polyester textile materials such as polyethylene terephthalate may be dyed at or near the boil for about 1 hour in presence of a carrier, for example o-hydroxydiphenyl, or at higher temperatures, e.g. 110° to 140° C. under pressure when the presence of a carrier is no longer necessary. Alternatively an aqueous dispersion of the dyestuff may be padded on to the polyester textile material and fixed by baking the material, for example for 1 to 2 minutes at between 180° and 200° C. The padding liquor may advantageously contain a thickener or migration inhibitor and other additives such as urea.

If desired, the process of the invention may be carried out by applying to the surface of the textile material a thickened printing paste containing an aqueous dispersion of the water-insoluble dyestuff, and subsequently steaming or baking. Suitable thickening agents include gum tragacanth, gum arabic, Nafka crystal gum, alginates, or oil-in-water emulsions. The printing paste may also contain commonly used adjuvants such as surface active agents and sodium m-nitrobenzenesulphonate.

After carrying out the process of the invention the textile material may be removed from the dyebath, steamer or baker, rinsed and treated with soap or synthetic detergent. It is also advantageous to treat a polyester textile material with a weak alkaline solution of sodium hydrosulphite before soaping, since this helps to remove loosely attached dyestuff from the surface of the fibres.

The dyeings obtained by the process of the invention are violet to greenish blue in colour and have very good fastness to washing and to light. Dyeings on polyester textile materials are especially valuable because they also have excellent fastness to dry-heat treatments such as are used in pleating operations.

Some of the dyestuffs used in the process of our invention are novel compounds.

According to a further feature of my invention I provide new water-insoluble dyestuffs of the formula

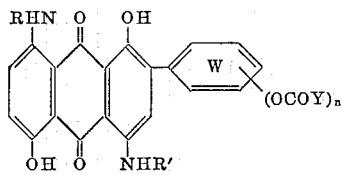

Formula 2 wherein R and R' represent lower alkyl or acyl radicals and may be the same or different, Y represents an aliphatic, cycloaliphatic, araliphatic or aryl radical and the benezene ring W may be further substituted except by halogen atoms, nitro or amino radicals, provided that the molecule is devoid of sulphonic and carboxylic acid groups, and $n$ is an integer from 1 to 3.

According to a further and preferred feature of my invention I provide new water-insoluble dyestuffs of the formula

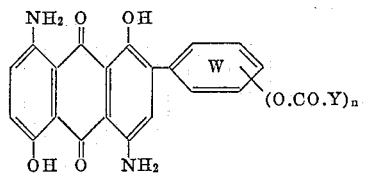

Formula 3 wherein Y represents an aliphatic, cycloaliphatic, araliphatic or aryl radical and the benzene nucleus W may be further substituted except by halogen atoms or nitrol or amino radicals, provided that the molecule is devoid of sulphonic and carboxylic acid groups, and $n$ is an integer from 1 to 3.

Aliphatic radicals representable by Y may be, for example, alkyl radicals such as methyl, ethyl, butyl or octyl, substituted alkyl radicals such as hydroxymethyl, methoxymethyl, phenoxymethyl, 2:4-dichlorophenoxymethyl or naphthoxymethyl, or alkenyl such as vinyl. Examples of cycloaliphatic, araliphatic and aryl radicals representable by Y are cyclohexyl, benzyl, p-chlorobenzyl, phenyl, p-tolyl and naphthyl. Preferably the radical represented by Y should not contain more than 8 carbon atoms.

Examples of further substituents which may be carried by the benzene nucleus W are alkyl radicals such as methyl, ethyl, n- and iso-propyl and n- and iso-butyl, hydroxy radicals, alkoxy radicals such as methoxy and butoxy, aryl radicals such as phenyl, cycloaliphatic radicals such as cyclohexyl. Preferably such a substituent should not contain more than 8 carbon atoms.

Dyestuffs of Formula 3, and especially of Formula 4 are very valuable as dyestuffs for polyethylene terephthalate because of their very high fastness to dry heat and the high temperatures employed in such operations as pleating.

According to yet a further feature of the invention there is provided a process for the manufacture of water-insoluble dyestuffs which comprises acylating a hydroxy compound of the formula

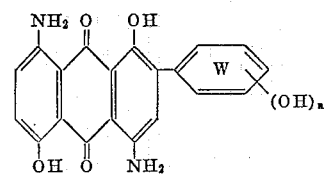

Formula 4 by treatment with a functional derivative of an acid of the formula Y.COOH wherein W, Y and $n$ have the meanings previously stated.

As examples of functional derivatives of an acid the anhydride or acid chloride may be mentioned. Specific examples are the anhydrides and acid chlorides of acetic, propionic, butyric, glycollic, methoxyacetic, hydroxypropionic, phenoxyacetic, benzoic, toluic, phenylacetic and cyclohexylcarboxylic acids.

This process of the invention may conveniently be carried out by stirring the hydroxy compound of Formula 4 with the anhydride or acid chloride in presence of a solvent, preferably a basic solvent such as pyridine, at a temperature between 0° and 100° C., and preferably between 20° and 70°. Under these conditions, when an anhydride is used, the quantity of anhydride does not appear to be a critical factor and, if desired, an excess of anhydride may be used. In cases where $n$ is 2 or 3, the acylation need not be complete, since products containing hydroxyl radicals in addition to the —O.CO.R radicals are valuable dyestuffs. The acylated product may conveniently be isolated from the mixture by pouring into water or other non-solvent for the product, hydrolysing the access anhydride, filtering off the precipitate, washing with water, and, if desired, drying.

The products obtained by the above process may be pure dyestuffs of Formula 3 or under certain conditions, for example when more than the theoretical quantity of anhydride is used they may contain a proportion of N-acyl derivative of such a dyestuff. When the acylation is carried out with an acid chloride in a non-basic solvent such as nitrobenzene N-acylation takes place in preference to O-acylation.

Mixtures of two or more dyestuffs of Formula 3 and mixtures of such dyecstuffs with their N-acyl derivatives are valuable products with excellent building up properties on polyester fibres. Such mixtures may readily be obtained by acylating a compound of Formula 4 with a mixture of anhydrides, for example by acylating 1:5-dihydroxy - 4:8 - diamino - 2(4' - hydroxyphenyl) - anthraquinone with a mixture of acetic and benzoic anhydrides.

The invention is illustrated but not limited by the following examples in which the parts are by weight.

*Example 1*

10 parts of a finely dispersed 10% paste of 1:5-dihydroxy - 4:8 - di(methylamino) - 2 - (4' - hydroxyphenyl) anthraquinone are added to 3000 parts of water containing 1 part of a formaldehyde/naphthalene sulfonic acid condensate. 100 parts of polyethylene terephthalate textile material is added and dyed by heating to 120° to 130° C. for 1 hour under pressure. The dyeing is rinsed in water and loose dye is removed from the fibres by a reduction treatment with alkaline hydrosulphite. A bright greenish blue dyeing is obtained possessing excellent fastness to light and sublimation.

*Example 2*

10 parts of a finely dispersed 10% paste of 1:5-dihydroxy - 4:8 - dimethylamino - 2 - (4' - hydroxyphenyl) anthraquinone are added to 3000 parts of water containing 3 parts of cetyl sodium sulphate and 5 parts of an 80% emulsion of butyl benzoate in water. 100 parts of cellulose triacetate textile material is added and dyed by heating to the boil for 1 hour. The dyeing is rinsed in water and treated with a warm solution of soap or synthetic detergent. A bright greenish blue dyeing is obtained.

*Example 3*

10 parts of a finely dispersed 10% paste of 1:5-dihydroxy - 4:8 - dimethylamino - 2 - (4' - hydroxyphenyl) anthraquinone are added to 3000 parts of water containing 3 parts of a cetylalcoholethylene oxide condensate. 100 parts of cellulose acetate textile material is added and dyed by heating to 85° for 1 hour. The dyeing is rinsed in water and treated with a warm solution of soap or synthetic detergent. A bright greenish blue dyeing is obtained.

The shades obtained by using other dyestuffs of the Formula 1 in place of the dyestuff used in Examples 1, 2 and 3 are indicated in the following table.

| Example | Dyestuff | Shade |
|---|---|---|
| 4 | 1:5-dihydroxy-4:8-dimethylamino-2-(4'-hydroxy-3'-methylphenyl)anthraquinone. | Greenish blue. |
| 5 | 1:5-dihydroxy-4:8-dimethylamino-2-(2'-hydroxy-5'-methylphenyl)anthraquinone. | Do. |
| 6 | 1:5-dihydroxy-4:8-dimethylamino-2-(2'-hydroxy-5'-phenylphenyl)anthraquinone. | Do. |
| 7 | 1:5-dihydroxy-4:8-dimethylamino-2-(4'-hydroxy-3'-phenylphenyl)anthraquinone. | Do. |
| 8 | 1:5-dihydroxy-4:8-dimethylamino-2-(4'-hydroxy-3-methoxyphenyl)anthraquinone. | Do. |
| 9 | 1:5-dihydroxy-4:8-dimethylamino-2-(2'-hydroxy-5'-methoxyphenyl)anthraquinone. | Do. |
| 10 | 1:5-dihydroxy-4:8-dimethylamino-2-(3':4'-dimethoxyphenyl)anthraquinone. | Do. |
| 11 | 1:5-dihydroxy-4:8-dimethylamino-2-(3':4'-dihydroxyphenyl)anthraquinone. | Do. |
| 12 | 1:5-dihydroxy-4:8-dimethylamino-2-(2':5'-dihydroxyphenyl)anthraquinone. | Do. |
| 13 | 1:5-dihydroxy-4:8-dimethylamino-2-(2'-methoxy-5'-methylphenyl)anthraquinone. | Do. |
| 14 | 1:5-dihydroxy-4:8-dimethylamino-2-(4'-hydroxy-3'-amylphenyl)anthraquinone. | Do. |
| 15 | 1:5-dihydroxy-4:8-dimethylamino-2-(2':4':6'-trihydroxyphenyl)anthraquinone. | Do. |
| 16 | 1:5-dihydroxy-4:8-dimethylamino-2-(4'-β-ethoxyethoxyphenyl)anthraquinone. | Do. |
| 17 | 1:5-dihydroxy-4:8-dimethylamino-2-(2'-hydroxy-5'-octylphenyl)anthraquinone. | Do. |
| 18 | 1:5-dihydroxy-4:8-dimethylamino-2-(4'-β-hydroxyethoxyphenyl)anthraquinone. | Do. |
| 19 | 1:5-dihydroxy-4:8-diethylamino-2-(4'-hydroxyphenyl)anthraquinone. | Do. |
| 20 | 1:5-dihydroxy-4:8-diethylamino-2-(4'-methoxyphenyl)anthraquinone. | Do. |
| 21 | 1:5-dihydroxy-4:8-dipropylamino-2-(4'-hydroxy-3'-methylphenyl)anthraquinone. | Do. |
| 22 | 1:5-dihydroxy-4:8-dibutylamino-2-(4'-hydroxyphenyl)anthraquinone. | Do. |
| 23 | 1:5-dihydroxy-4:8-dimethylamino-2-(4'-acetoxyphenyl)anthraquinone. | Do. |
| 24 | 1:5-dihydroxy-4:8-dimethylamino-2-(4'-propionyloxyphenyl)anthraquinone. | Do. |
| 25 | 1:5-dihydroxy-4:8-dimethylamino-2-(4'-benzoyloxyphenyl)anthraquinone. | Do. |
| 26 | 1:5-dihydroxy-4-amino-8-acetylamino-2-(4'-acetoxyphenyl)anthraquinone. | Reddish blue. |
| 27 | 1:5-dihydroxy-4:8-diamino-2-(4'-mesyloxyphenyl)anthraquinone. | Blue. |
| 28 | 1:5-dihydroxy-4:8-diacetylamino-2-(4'-acetoxyphenyl)anthraquinone. | Violet. |
| 29 | 1:5-dihydroxy-4:8-diacetylamino-2-(4'-methoxyphenyl)anthraquinone. | Do. |
| 30 | 1:5-dihydroxy-4:8-dipropionylamino-2-(4'-acetoxyphenyl)anthraquinone. | Do. |
| 31 | 1:5-dihydroxy-4-amino-8-benzoylamino-2-(4'-acetoxyphenyl)anthraquinone. | Bluish violet. |
| 32 | 1:5-dihydroxy-4-methylamino-8-acetyl-methylamino-2-(4'-acetoxyphenyl)anthraquinone. | Blue. |

Example 33

36 parts of 1:5 - dihydroxy - 4:8 - diamino - 2(4' - hydroxyphenyl)anthraquinone, 300 parts of dry pyridine and 20 parts of acetic anhydride are stirred at between 20 and 25° C., for 1 hour. The ester product is isolated by drowning the mixture into cold water, filtering off the solid and washing free of pyridine with cold water. The 1:5 - dihydroxy - 4:8 - diamino - 2(4' - acetoxyphenyl) anthraquinone so obtained is converted into a dispersed paste by gravel-milling with water and a dispersing agent. It can be used for dyeing polyethylene terephthalate materials in bright-blue shades of good strength and of very good fastness to sublimation and to light.

Example 34

In place of 20 parts of acetic anhydride in Example 1 there are used 25 parts of propionic anhydride. The 1:5-dihydroxy - 4:8 - diamino - 2(4' - propionyloxyphenyl) anthraquinone so obtained dyes cellulose acetate and triacetate and polyethylene terephthalate textile materials in fast bright blue shades.

Example 35

In place of 20 parts of acetic anhydride in Example 33 there are used 45 parts of benzoic anhydride. The mixture is then warmed to 60° for 1 hour to complete the acylation. The product is precipitated by drowning into water and the suspension is filtered off, washed with water and converted into a dispersed paste. The 1:5-dihydroxy-4:8 - diamino - 2(4' - benzoyloxyphenyl)anthraquinone yields fast bright blue shades on polyethylene terephthalate textile material.

Example 36

36 parts of 1:5 - dihydroxy - 4:8 - diamino - 2 - (4'-hydroxyphenyl)anthraquinone and 300 parts of dry pyridine are heated to 80° C. to dissolve, then cooled to 20° C. with stirring. 9 parts of propionic anhydride are added over 15 minutes at 20° to 25° C. followed by 10 parts of acetic anhydride. The mixture is stirred at 20 to 25° C. for 1 hour after which time the product is isolated by drowning into cold water, filtering off the solid and washing free from pyridine with cold water. The product is a mixture of 1:5 - dihydroxy - 4:8 - diamino - 2(4' - acetoxyphenyl)anthraquinone and 1:5 - dihydroxy - 4:8 - diamino - 2(4' - propionyloxyphenyl)anthraquinone with a small proportion of N-acetylated derivatives of these compounds and is converted into a dispersed paste by gravel-milling with water and a dispersing agent. It can be used for dyeing cellulose acetate and triacetate and polyethylene terephthalate textile materials in bright blue shades of good strength and of very good fastness to sublimation and to light.

Example 37

36 parts of 1:5 - dihydroxy - 4:8 - diamino - 2(4' - hydroxyphenyl)anthraquinone and 300 parts of dry pyridine are stirred and heated to 80° C. to dissolve, then cooled to 50° C. 15 parts of benzoic anhydride are added and the temperature raised to 80° and held for 1 hour before cooling to 20° C. 10 parts of acetic anhydride are run in during 15 minutes and the mixture stirred at 20° to 25° C. for 1½ hours. The product is isolated and converted into a dispersed paste in the manner described in the preceding example. It can be used for dyeing triacetate and polyethylene terephthalate textile materials in bright, very fast blue shades. It consists of a mixture of 1:5 - dihydroxy - 4:8 - diamino - 2(4' - acetoxyphenyl) anthraquinone, and 1:5 - dihydroxy - 4:8 - diamino-2(4' - benzoyloxyphenyl)anthraquinone, together with a small proportion of N-acetylated derivatives of these compounds.

Example 38

36 parts of 1:5 - dihydroxy - 4:8 - diamino - 2(4' - hydroxyphenyl)anthraquinone and 300 parts of dry pyridine are stirred at 80° C. to disolve, then cooled to 20° C. 25 parts of acrylic anhydride are added dropwise during 15 minutes at 20° to 25° C. and the mixture stirred at this temperature for 3 hours. The product is isolated by drowning into cold water, filtering off the solid and washing free from pyridine with cold water. It is converted into a dispersed paste by gravel-milling with a dispersing agent. The dyestuff, which is mainly 1:5 - dihydroxy-4:8 - diamino - 2(4' - acrylyloxyphenyl)anthraquinone mixed with a small proportion of N-acyl derivatives, dyes polyethylene terephthalate textile materials in fast blue shades.

Example 39

36 parts of 1:5 - dihydroxy - 4:8 - diamino - 2(4' - hydroxyphenyl)anthraquinone and 30 parts of dry pyridine are heated to 80° C., then cooled to 20° C. before adding 47.5 parts of cyclohexane carboxylic anhydride. The mixture is stirred at 20° to 25° C. for 3 hours before pouring into cold water, filtering the suspended dyestuff, washing pyridine free with water and finally converting to a dispersed paste by gravel milling with water and a little dispersing agent. The product dyes polyethylene terephthalate in bright blue shades of very good fastness to light and sublimation. It consists mainly of 1:5-dihydroxy - 4:8 - diamino - 2(4' - hexahydrobenzoyloxyphenyl)anthraquinone.

Example 40

By replacing the cyclohexane carboxylic anhydride in the preceding example by 32 parts of n-butyric anhydride, the blue dye 1:5-dihydroxy-4:8-diamino-2(4'-n-butyroxyphenyl)anthraquinone mixed with a little of the N-acyl derivative is obtained. It dyes polyethylene terephthalate in fast blue shades.

Example 41

The process of Example 40 is repeated using 32 parts of isobutyric anhydride. The product dyes polyethylene terephthalate fast bright blue shades.

Example 42

The process of Example 40 is repeated using 16 parts of n-butyric anhydride and 16 parts of isobutyric anhydride. The mixture dye obtained yields fast blue shades on triacetate and polyethylene terephthalate.

Example 43

38 parts of 1:5-dihydroxy-4:8-diamino-2(4'-hydroxy-3'-methylphenyl)anthraquinone and 300 parts of pyridine are stirred at 80° C. for 15 minutes, then cooled to 20° C. 20 parts of acetic anhydride are added at 20° to 25° C. during 15 minutes after which the mixture is stirred at the same temperature for 2 hours. The acylation product is drowned into cold water and the precipitated mixture of 1:5-dihydroxy-4:8-diamino-2(4'-acetoxy - 3' - methylphenyl)anthraquinone with some 10% of its N-acetylated derivative filtered off, washed with cold water until free from pyridine and the filter-cake converted into a dispersed paste by the method described in previous examples. The product dyes polyethylene terephthalate in fast bright blue shades.

Example 44

39 parts of 1:5-dihydroxy-4:8-diamino-2(4'-hydroxy-3'-methoxyphenyl)anthraquinone and 300 parts of dry pyridine are stirred at 80° to 90° C. to dissolve the solid, and cooled slowly to 20° C. 20 parts of acetic anhydride are run in at 20° to 25° C. during 15 minutes and the mixture is stirred for 3 hours at this temperature. The mixture product, 1:5 - dihydroxy - 4:8 - diamino-2(4'-acetoxy-3'-methoxyphenyl)anthraquinone with some 5% of its N-acetyl derivative is isolated and converted into a dispersed paste by the process described in previous examples. It dyes polyethylene terephthalate in fast bright blue shades.

Example 45

38 parts of 1:5-dihydroxy - 4:8 - diamino-2(3':4'-dihydroxyphenyl)anthraquinone and 500 parts of dry pyridine are stirred and heated at 80° to 90° C., then cooled to 20° C. 20 parts of acetic anhydride are run in at 20° to 25° during 15 minutes and the mixture stirred at 20° for 1 hour. The dyestuff is isolated by drowning into water, partially acidifying with hydrochloric acid, filtering off and washing pyridine free with water. When converted into a dispersed paste by gravel-milling in presence of a dispersing agent it dyes polyester fibres in fast blue shades. It is a mixture consisting mainly of 1:5-dihydroxy-4:8-diamino-2(3':4'-diacetoxyphenyl)anthraquinone with a small proportion of N-acetylated derivative.

Example 46

19 parts of benzoyl chloride, 25 parts of sodium benzoate and 250 parts of dry pyridine are stirred at 90° to 95° C. for 1 hour before cooling to 50° C. and adding 36 parts of 1:5-dihydroxy - 4:8 - diamino-2(4'-hydroxyphenyl)anthraquinone. The mixture is stirred at 80° for 1 hour and then cooled to 20° C. 15 parts of acetic anhydride are run in during 15 minutes and the acylation completed by stirring at 20° to 25° C. for 2 hours. For the isolation, the pyridine mixture is poured into cold water, the precipitated product filtered off and the filter-cake washed free of pyridine, with water. When converted into a dispersed paste as previously described, the mixture dyestuff colours polyethylene terephthalate in very fast bright blue shades. It consists of approximately equal weights of 1:5-dihydroxy - 4:8 - diamino - 2(4'-acetoxyphenyl)anthraquinone and 1:5-dihydroxy-4:8-diamino-2(4'-benzoyloxyphenyl)anthraquinone.

Example 47

36 parts of 1:5-dihydroxy-4:8-diamino-2(4'-hydroxyphenyl)anthraquinone, 200 parts of methyl ethyl ketone and 50 parts of dry pyridine are stirred at 80° C. for 1 hour, then cooled to 20° C. 20 parts of acetic anhydride are run in during 15 minutes and the acetylation completed at 20° to 25° C. during 3 hours. The dyestuff is isolated by pouring into water, filtering the suspension and washing with water. When dispersed in water it may be used for dyeing triacetate and polyethylene terephthalate in fast blue shades.

Example 48

38 parts of 1:5-dihydroxy-4:8-diamino-2(2'-hydroxy-5-cyclohexylphenyl)anthraquinone and 300 parts of dry pyridine are heated with stirring to 80°, then cooled to 20°. 30 parts of acetic anhydride are run in during 15 minutes and the mixture stirred at 20° to 25° C. for 1 hour. The dyestuff is isolated by pouring the mixture into water, filtering off the precipitated product and washing the filter-cake with water. When converted into a dispersed powder it dyes polyethylene terephthalate in bright fast blue shades. It consists of a mixture of 1:5-dihydroxy-4:8-diamino-2(2'-acetoxy - 5 - cyclohexylphenyl)anthraquinone with some of its N-acetyl derivative.

Example 49

38 parts of 1:5-dihydroxy-4:8-diamino(2':5'-dihydroxyphenyl)anthraquinone, 300 parts of dry pyridine and 40 parts of acetic anhydride are stirred and heated at 50° C. for 1 hour. The product is isolated as in Example 48. It is a mixture containing a proportion of N-acetylated products which when suitably dispersed dye polyethylene terephthalate in violet shades of good fastness to sublimation and light.

Example 50

38 parts of 1:5-dihydroxy-4:8-diamino-2(3':4':5'-trihydroxyphenyl)anthraquinone, and 400 parts of dry pyridine are stirred at 80° for 15 minutes, then cooled to 20° before adding 60 parts of acetic anhydride. After stirring at 20° for 1 hour, the product is isolated as described in Example 16. It consists mainly of N-acetylated products which dye polyethylene terephthalate in reddish violet shades.

Example 51

36 parts of 1:5-dihydroxy-4:8-diamino-2(4'-hydroxyphenyl)-anthraquinone, 250 parts of dry pyridine and 23 parts of toluyl chloride are stirred at 55° to 60° for 6 hours. The dyestuff is isolated by pouring the reaction-mixture into 3000 parts of water, adding some hydrochloric acid to complete the precipitation of the product, filtering off and washing the solid with water and converting the filter-cake to a finely dispersed paste by gravel-milling with water and dispersing agent. The mixture dyestuff thus obtained yields reddish blue solutions in pyridine and dyes polyethylene terephthalate in fast reddish blue shades. One of the main constituents in the dyestuff is 1:5-dihydroxy - 4 - amino-8-(p-methylbenzoylamino)-2-(4'-p-methylbenzoyloxyphenyl)anthraquinone.

Example 52

36 parts of 1:5-dihydroxy-4:8-diamino-2(4'-hydroxyphenyl)anthraquinone and 250 parts of dry pyridine are stirred at 20° to 25° C. and 45 parts of phenylacetyl chloride are run in during 15 minutes. The mixture is heated to 55° to 60° C. for 3 hours to yield a bluish-violet solution. The dyestuff is obtained by cooling to 20° C., pouring the reaction mixture into cold water, acidifying with hydrochloric acid, filtering the precipitated product, washing with water and drying at 60° C. The violet blue solid is mainly 1:5-dihydroxy-4-amino-8-phenylacetylamino-2(4'-phenylacetoxyphenyl)anthraquinone which dyes polyethylene terephthalate in bluish violet to reddish blue shades.

Example 53

36 parts of 1:5-dihydroxy-4:8-diamino-2(4'-hydroxyphenyl)anthraquinone, 1000 parts of nitrobenzene and 38 parts of phenylacetyl chloride are heated to 100° C. in 30 minutes and maintained at 100° C. for another 30 minutes. The reddish-violet solution is cooled, steam distilled to remove the nitrobenzene, the precipitated dyestuff filtered off and finally washed with water. This crude mixture of phenyl acetylated products contains bluish-violet and reddish-violet components. When converted into a finely dispersed paste for dyeing it yields reddish purple shades on polyethylene terephthalate.

Example 54

36 parts of 1:5-dihydroxy-4:8-diamino-2(4'-hydroxyphenyl)anthraquinone, 300 parts of nitrobenzene and 250 parts of acetic anhydride are stirred at 100° C. for 1 hour. The violet mixture is poured into 2000 parts of ethanol at 60° C. and allowed to cool. The separated product is filtered off, washed with ethanol and dried. It consists mainly of 1:5-dihydroxy-4:8-diacetylamino-2(4'-hydroxyphenyl)anthraquinone and when converted into a dispersed paste it dyes polyethylene terephthalate in violet shades of high fastness to sublimation and to light.

If in this example the reaction period is extended from 1 hour to 1½ hours a product dyeing polyethylene terephthalate in redder shades of violet is obtained.

Example 55

36 parts of 1:5-dihydroxy-4:8-diamino-2(4'-hydroxyphenyl)anthraquinone and 1000 parts of nitrobenzene are stirred at 130° C. and 125 parts of acetic anhydride are run in gradually during 15 minutes. The reaction is continued at 130° for 1 hour before steam distilling off the nitrobenzene, filtering off the precipitated dyestuff and washing with water. The violet product consists of a mixture of 1:5-dihydroxy-4:8-diacetylamino-2(4'-hydroxyphenyl)anthraquinone and some reddish-violet more completely acetylated products of unknown structure. The finely dispersed dyestuff produces reddish-violet shades on polyethylene terephthalate which have good fastness to sublimation and to light.

Example 56

38.5 parts of 1:5-dihydroxy-4:8-dimethylamino-2-(4'-hydroxy-3'-methylphenyl)anthraquinone, 350 parts of dry pyridine and 16 parts of benzoic anhydride are stirred together and heated at 80° to 90° C. for 2 hours. The mixture is cooled to 20° before pouring into 3000 parts of water. Some hydrochloric acid is added to complete the precipitation of the dyestuff which is then filtered off, washed with water and milled with a dispersing agent to give a finely dispersed paste. The product, which consists mainly of 1:5-dihydoxy-4:8 - dimethylamino-2-(4'-benzoyloxy - 3' - methylphenyl)anthraquinone mixed with some of the starting material, dyes polyester fibres in fast greenish blue shades.

Example 57

38 parts of 1:5-dihydroxy-4:8-dimethylamino-2-(4'-hydroxyphenyl)anthraquinone and 300 parts of dry pyridine are stirred at 80° C. for 1 hour, before cooling to 20° C. and adding 20 parts of acetic anhydride during 15 minutes. The reaction is continued at 20° C. for 2 hours before pouring the charge into water, filtering off and washing with water. The mixture product consists of 1:5-dihydroxy - 4:8 - dimethylamino-2-(4' - acetoxyphenyl)anthraquinone, a greenish-blue dye, together with proportions of violet N-acetyl derivatives which assist the affinity for polyester fibres. When suitably dispersed the product yields fast, somewhat reddish-blue shades on polyester fibres.

Varying quantities of acetic anhydride can be used in the above process. With 10 parts of acetic anhydride a greener blue of brighter shade is obtained; with 30 parts, more N-acetylation occurs and the final product is bluish-violet on polyester fibres.

Similar dyestuff mixtures are obtained by replacing the acetic anhydride in this example by stoichiometrically equivalent amounts of propionic, butyric or phenylacetic anhydrides, or mixtures of these.

I claim:

1. Water-insoluble dyestuffs of the formula:

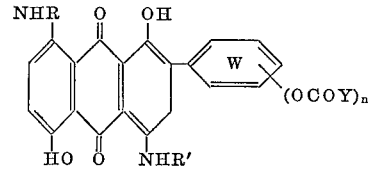

wherein:
R and R' are independently selected from the class consisting of hydrogen, lower alkyl and groups of the formula —COY;
Y is selected from the class consisting of lower alkyl, cyclohexyl, phenyl, tolyl, benzyl and vinyl;
$n$ is a positive integer not exceeding 3;
and any further substituent on the benzene ring W is selected from the class consisting of lower alkyl, cyclohexyl, phenyl and hydroxyl.

2. 1:5 - dihydroxy - 4:8-diamino-2-(4'-acetoxyphenyl) anthraquinone.

3. 1:5 - dihydroxy - 4:8 - diamino - 2-(4'-benzoyloxyphenyl)anthraquinone.

4. 1:5-dihydroxy-4-amino-8-acetylamino-2-(4'-acetoxyphenyl)anthraquinone.

References Cited

UNITED STATES PATENTS

| | | | |
|---|---|---|---|
| 2,411,148 | 11/1946 | Dickey et al. | 260—376 |
| 3,043,646 | 7/1962 | Buecheler | 260—380 X |
| 3,265,460 | 8/1966 | Hoare | 8—39 |

OTHER REFERENCES

Von Georgievics, G., et al.: Dye Chemistry, Hudgate, England; Scott, Green & Son (1920), pp. 4–7.

LORRAINE A. WEINBERGER, *Primary Examiner.*

LEON ZITVER, RICHARD K. JACKSON, *Examiners.*

H. C. WEGNER, *Assistant Examiner.*